(12) United States Patent
Kim et al.

(10) Patent No.: US 9,187,672 B2
(45) Date of Patent: Nov. 17, 2015

(54) HARD COATING FILM, COMPOSITION FOR HARD COATING FILM, POLARIZING PLATE INCLUDING THE SAME, AND LIQUID CRYSTAL DISPLAY INCLUDING THE SAME

(71) Applicants: Sang Shin Kim, Uiwang-si (KR); Dong Yoon Shin, Uiwang-si (KR); Hae Ryong Chung, Uiwang-si (KR)

(72) Inventors: Sang Shin Kim, Uiwang-si (KR); Dong Yoon Shin, Uiwang-si (KR); Hae Ryong Chung, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 453 days.

(21) Appl. No.: 13/672,953

(22) Filed: Nov. 9, 2012

(65) Prior Publication Data
US 2013/0120838 A1    May 16, 2013

(30) Foreign Application Priority Data
Nov. 10, 2011    (KR) ........................ 10-2011-0117190

(51) Int. Cl.
*C09D 135/02* (2006.01)
*G02B 1/10* (2015.01)
*C09D 133/14* (2006.01)
*B82Y 30/00* (2011.01)

(52) U.S. Cl.
CPC ............ *C09D 135/02* (2013.01); *C09D 133/14* (2013.01); *G02B 1/105* (2013.01); *B82Y 30/00* (2013.01); *C08L 2312/00* (2013.01); *Y10S 977/773* (2013.01)

(58) Field of Classification Search
None
See application file for complete search history.

(56) References Cited

U.S. PATENT DOCUMENTS
2012/0270027 A1* 10/2012 Hwang et al. ................. 428/220

FOREIGN PATENT DOCUMENTS
KR    10-2011-0079522 A    7/2011

OTHER PUBLICATIONS
Kim, Synthesis and Properties of Photocurable Polyester Polyol Modified Hyperbranched Methacrylates, Feb. 2005, pp. 93-100, vol. 16 No. 1, J. Korean Ind. Eng. Chem.
Korean Office Action dated Apr. 26, 2014.

* cited by examiner

*Primary Examiner* — Vu A Nguyen
(74) *Attorney, Agent, or Firm* — Lee & Morse, P.C.

(57) ABSTRACT

A hard coating film may include a cured product of a polyester polyol modified hyperbranched (meth)acrylate represented by Formula 1:

[Formula 1]
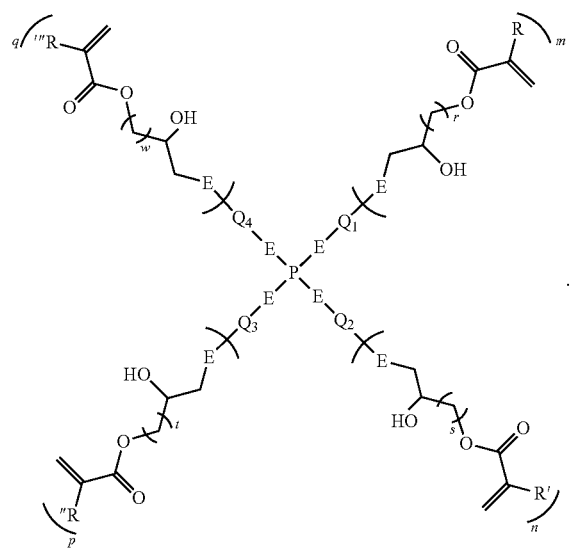
19 Claims, 1 Drawing Sheet

HARD COATING FILM, COMPOSITION FOR HARD COATING FILM, POLARIZING PLATE INCLUDING THE SAME, AND LIQUID CRYSTAL DISPLAY INCLUDING THE SAME

CROSS-REFERENCE TO RELATED APPLICATION

This application claims priority under 35 U.S.C. §119 to Korean Patent Application No. 10-2011-0117190 filed on Nov. 10, 2011, in the Korean Intellectual Property Office, and entitled: "HARD COATING FILM, COMPOSITION FOR HARD COATING FILM, POLARIZING PLATE INCLUDING THE SAME, AND LIQUID CRYSTAL DISPLAY INCLUDING THE SAME," the entire contents of which is hereby incorporated by reference.

BACKGROUND

Embodiments relate to a hard coating film, a composition for the hard coating film, a polarizing plate including the same, and a liquid crystal display including the same.

SUMMARY

Embodiments are directed to a hard coating film that may include a cured product of a polyester polyol modified hyperbranched (meth)acrylate represented by Formula 1.

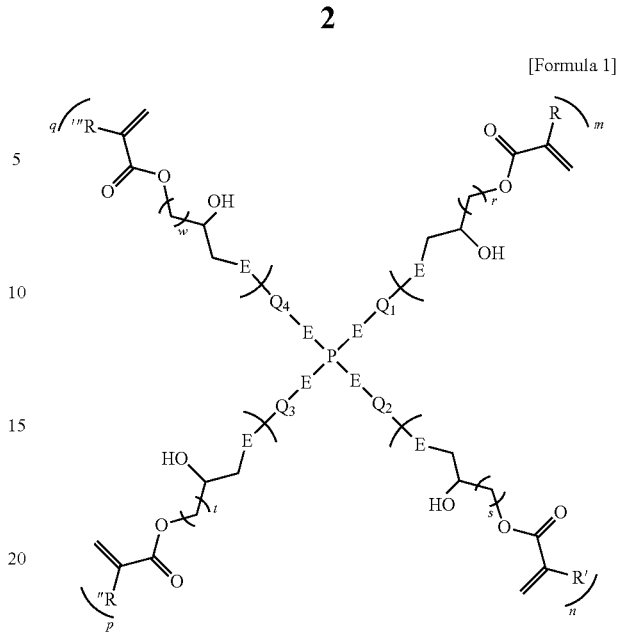

[Formula 1]

In Formula 1, P may be a $C_2$-$C_{50}$ polyester, E may be a divalent ester moiety, $Q_1$, $Q_2$, $Q_3$, and $Q_4$ each independently may be selected from the group of a $C_2$-$C_{50}$ aliphatic hydrocarbon and a $C_6$-$C_{50}$ aromatic hydrocarbon, m, n, p, q, r, s, t, and w each independently may be an integer from 1 to 10, and R, R', R", and R''' each independently may be selected from the group of hydrogen and a $C_1$-$C_5$ alkyl group, and film curling of the hard coating film may be from 0 to about 20 mm when the hard coating film has a thickness of about 2 μm to about 30 μm, and is stacked on a base film having a thickness of about 40 μm or less.

The polyester polyol modified hyperbranched (meth)acrylate may have a weight average molecular weight of about 2000 g/mol to about 3000 g/mol.

The polyester polyol modified hyperbranched (meth)acrylate may be represented by Formula 2:

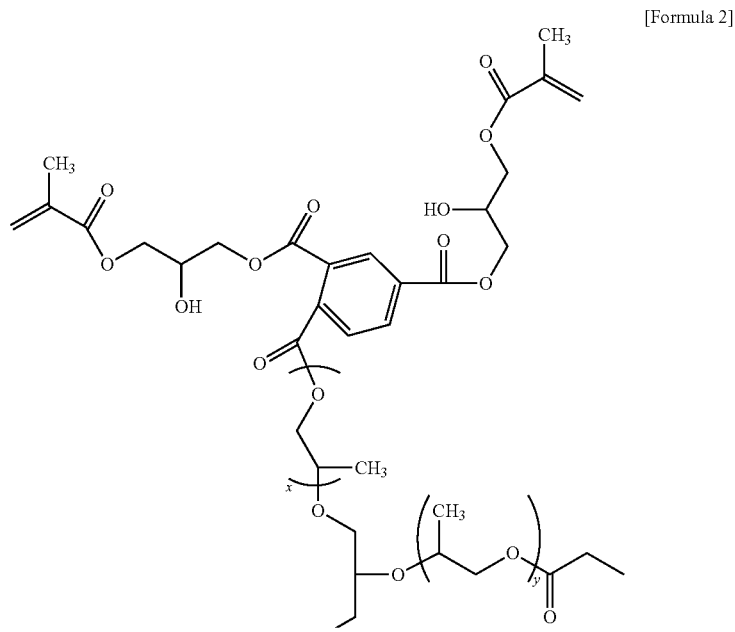

[Formula 2]

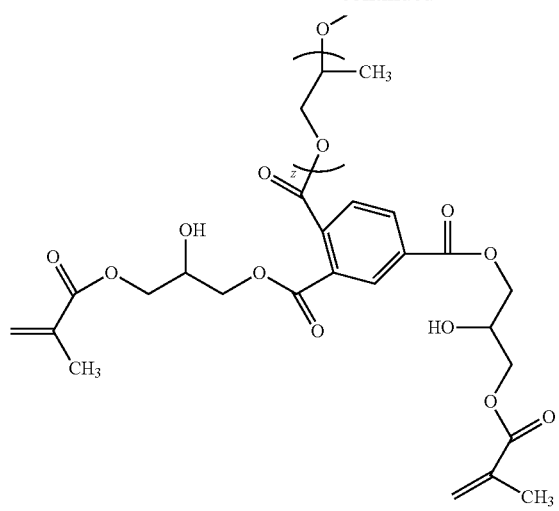
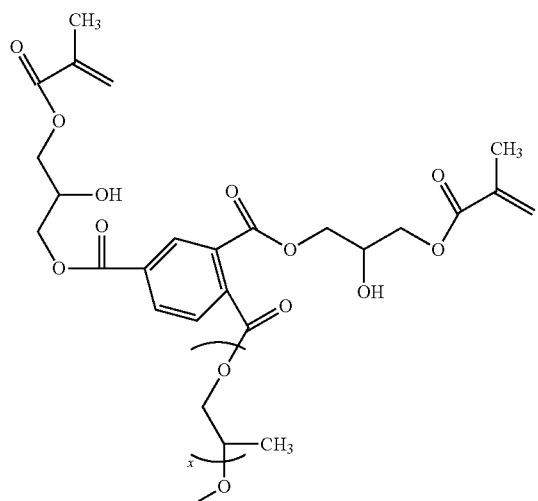
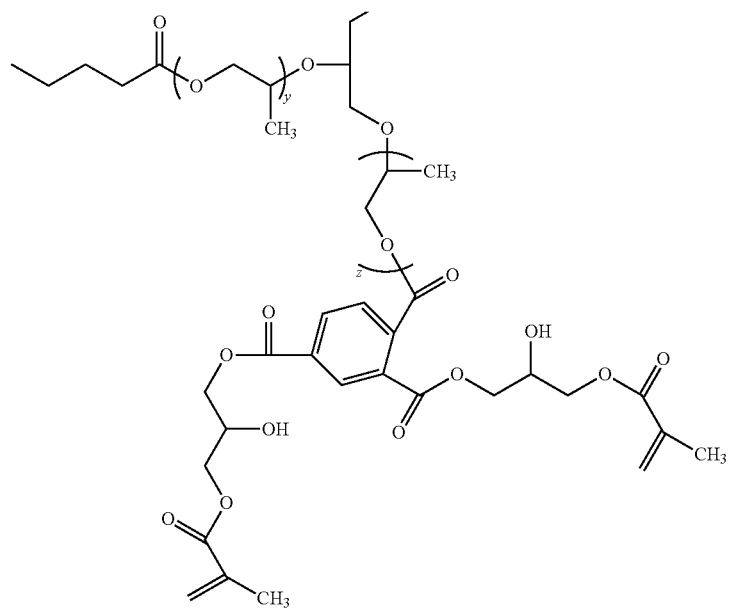

In Formula 2, x, y, and z each independently may be an integer from 0 to 5, with the proviso that x+y+z>0.

About 10 wt % to about 30 wt % of the hard coating film may be from the polyester polyol modified hyperbranched (meth)acrylate.

The hard coating film may be formed of a composition and the composition may include the polyester polyol modified hyperbranched (meth)acrylate, a hyperbranched (meth)acrylate oligomer represented by Formula 3, reactive nanoparticles, a polyfunctional monomer, and a photopolymerization initiator.

[Formula 3]

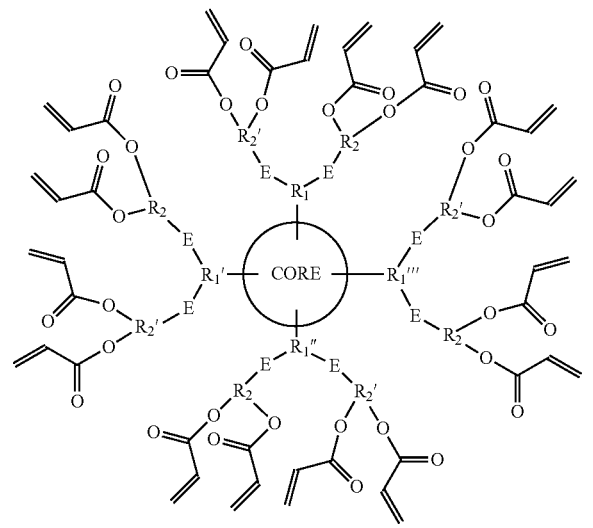

In Formula 3, the core may be selected from the group of a $C_3$-$C_{50}$ aliphatic hydrocarbon and a $C_6$-$C_{50}$ aromatic hydrocarbon, $R_1$, $R_1'$, $R_1''$, $R_1'''$, $R_2$, and $R_2'$ each independently may be selected from the group of a $C_1$-$C_{50}$ aliphatic hydrocarbon and a $C_6$-$C_{50}$ aromatic hydrocarbon, and E may be a divalent ester moiety.

In Formula 3, at least one selected from the group of the core, $R_1$, $R_1'$, $R_1''$, $R_1'''$, $R_2$, and $R_2'$ may include at least one heteroatom.

The hyperbranched (meth)acrylate oligomer may have a weight average molecular weight of about 5000 g/mol to about 10,000 g/mol.

The reactive nanoparticles may have an average particle diameter of about 10 nm to about 100 nm.

The reactive nanoparticles may include inorganic nanoparticles, and about 3% to about 50% of a surface area of the inorganic nanoparticles may be surface-treated with a (meth)acrylate compound.

The inorganic nanoparticles may include at least one selected from the group of $SiO_2$, $Al_2O_3$, $CaCO_3$, and $TiO_2$.

The polyfunctional monomer may include at least one selected from the group of a hydroxyl group-containing polyfunctional (meth)acrylate compound and a fluorine modified polyfunctional (meth)acrylate compound.

The composition may include about 10 wt % to about 30 wt % of the polyester polyol modified hyperbranched (meth)acrylate, about 15 wt % to about 60 wt % of the hyperbranched (meth)acrylate oligomer, about 5 wt % to about 60 wt % of the reactive nanoparticles, about 1 wt % to about 40 wt % of the polyfunctional monomer, and about 1 phr by weight to about 10 phr by weight of the photopolymerization initiator, based on a total weight of the polyester polyol modified hyperbranched (meth)acrylate, the hyperbranched (meth)acrylate oligomer, the reactive nanoparticles, and the polyfunctional monomer.

The composition may further include a reactive fluorine compound.

The reactive fluorine compound may represented by Formula 4:

Ar—Rf—Ar     [Formula 4]

In Formula 4, Ar may be $CH_2=CR_3COO$, $R_3$ may be selected from the group of a hydrogen atom and a $C_1$-$C_3$ alkyl group, Rf may be a perfluoroalkylene group having a structure represented by one selected from the group of Formulae 5-A, 5-B, 5-C, 5-D, and 5-E.

Formula 5-A
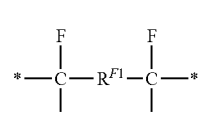

Formula 5-B
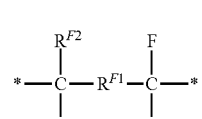

Formula 5-C
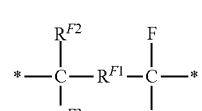

Formula 5-D
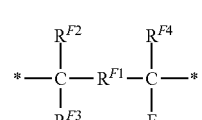

Formula 5-E
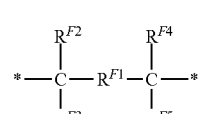

In Formulae 5-A, 5-B, 5-C, 5-D, and 5-E, * may be a bonding site for Ar, $R^{F1}$ may be a straight or branched $C_1$-$C_{10}$ perfluoroalkylene group, and $R^{F2}$, $R^{F3}$, $R^{F4}$, and $R^{F5}$ each independently may be H, a straight or branched $C_1$-$C_{14}$ perfluoroalkyl group The reactive fluorine compound may be present in an amount of about 0.01 parts by weight to about 5 parts by weight, based on 100 parts by weight of the composition.

Embodiments are also directed to a composition for hard coating films that may include a polyester polyol modified hyperbranched (meth)acrylate represented by Formula 1, a hyperbranched (meth)acrylate oligomer represented by Formula 3, reactive nanoparticles, a polyfunctional monomer, and a photopolymerization initiator.

[Formula 1]

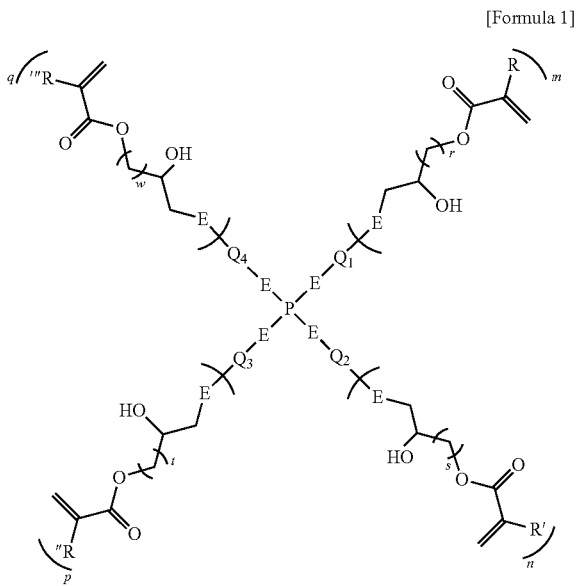

In Formula 1, P may be a $C_2$-$C_{50}$ polyester, E may be a divalent ester moiety, $Q_1$, $Q_2$, $Q_3$, and $Q_4$ each independently may be selected from the group of a $C_2$-$C_{50}$ aliphatic hydrocarbon and a $C_6$-$C_{50}$ aromatic hydrocarbon, m, n, p, q, r, s, t, and w each independently may be an integer from 1 to 10, and R, R', R", and R'" each independently may be selected from the group of hydrogen and a $C_1$-$C_5$ alkyl group.

[Formula 3]

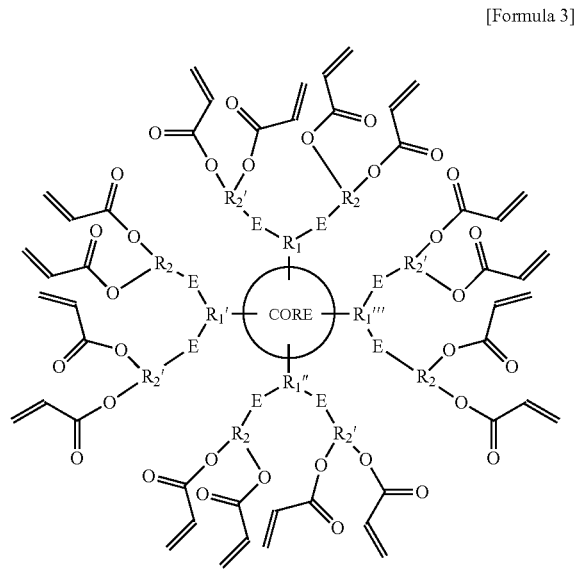

In Formula 3, the core may be selected from the group of a $C_3$-$C_{50}$ aliphatic hydrocarbon and a $C_6$-$C_{50}$ aromatic hydrocarbon, $R_1$, $R_1'$, $R_1''$, $R_1'''$, $R_2$, and $R_2'$ each independently may be selected from the group of a $C_1$-$C_{50}$ aliphatic hydrocarbon and a $C_6$-$C_{50}$ aromatic hydrocarbon, and E may be a divalent ester moiety.

The composition may include about 10 wt % to about 30 wt % of the polyester polyol modified hyperbranched (meth)acrylate, about 15 wt % to about 60 wt % of the hyperbranched (meth)acrylate oligomer, about 5 wt % to about 60 wt % of the reactive nanoparticles, about 1 wt % to about 40 wt % of the polyfunctional monomer, and about 1 phr by weight to about 10 phr by weight of the photopolymerization initiator, based on a total weight of the polyester polyol modified hyperbranched (meth)acrylate, the hyperbranched (meth)acrylate oligomer, the reactive nanoparticles, and the polyfunctional monomer.

The composition may further include a reactive fluorine compound.

Embodiments are also directed toward a polarizing plate, that may include a polarizer, a base film on at least one surface of the polarizer, and the hard coating film.

Embodiments are also directed toward a liquid crystal display that may include the polarizing plate.

BRIEF DESCRIPTION OF THE DRAWING

Features will become apparent to those of skill in the art by describing in detail exemplary embodiments with reference to the attached drawing in which.

DETAILED DESCRIPTION

Figure 1:
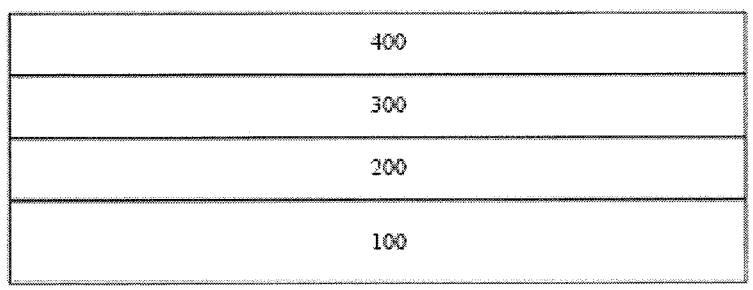
FIG. 1 illustrates a liquid crystal display according to an embodiment.

Example embodiments will now be described more fully hereinafter with reference to the accompanying drawing; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figure, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

In an embodiment, a hard coating film may exhibit curling of from 0 to about 20 mm when stacked in a thickness of about 2 μm to about 30 μm on a base film having a thickness of about 40 μm or less. Within this range, the hard coating film may exhibit excellent hardness, and curling and a rainbow phenomenon may be substantially reduced. In particular, film curling may be greater than or equal to 0 and not more than about 15 mm.

Figure 2:
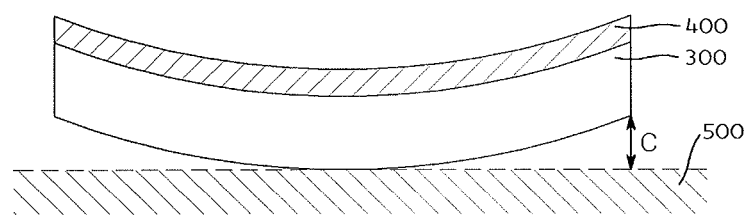
FIG. 2 illustrates a film curling.

As shown in FIG. 2, film curling may be determined by measuring a maximum height C of the curled hard coating film from the bottom 500 of the hard coating film when the hard coating film 400 is stacked to a thickness of about 2 μm to about 30 μm on a base film 300 having a thickness of about 40 μm or less.

The base film may be stacked on both surfaces of a polarizer in a polarizing plate, and thus may be a protective film for a polarizer. Examples of the base film may include at least one selected from the group of celluloses (such as triacetylcellulose (TAC)), polycarbonates, polyamides, polyimides, polyolefins, polyesters, polyestersulfones, and the like, and combinations thereof. The thickness of the base film may be about 40 μm or less, more particularly from about 25 μm to about 40 μm.

The hard coating film may have a pencil hardness of about 3H or more, more particularly about 4H or more. The pencil hardness may be determined by Pencil Hardness Tester (Shinto Scientific, Heidon) using Mitsubishi Pencil (UNI) after drawing a line at a rate of 0.5 mm/sec under a load of 500 kg/cm².

The hard coating film may include a cured product of a (A) polyester polyol modified hyperbranched (meth)acrylate.

(A) Polyester Polyol Modified Hyperbranched (meth) acrylate

The polyester polyol modified hyperbranched (meth)acrylate may have a structure in which a hyperbranched modified polyester is bound to $C_5$-$C_{20}$ (meth)acrylates with hydroxyl groups.

In an embodiment, the polyester polyol modified hyperbranched (meth)acrylate may have a structure represented by Formula 1:

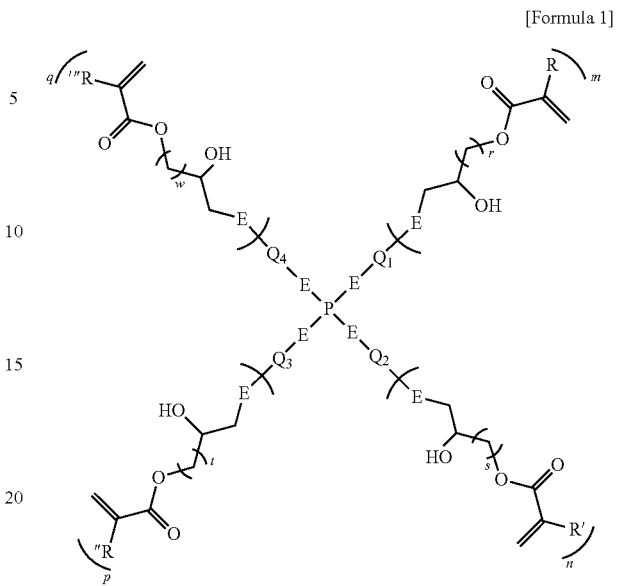

[Formula 1]

In Formula 1, P may be a $C_2$-$C_{50}$ polyester (e.g., a $C_2$-$C_{50}$ polyester polyol), E may be a divalent ester moiety (—O(C=O)— or —(O=C)O— in which a carbon of $Q_n$ is bonded to the carbon of E), $Q_1$, $Q_2$, $Q_3$, and $Q_4$ each independently may be selected from the group of a $C_2$-$C_{50}$ aliphatic hydrocarbon or a $C_6$-$C_{50}$ aromatic hydrocarbon, m, n, p, q, r, s, t, and w each independently may be an integer from 1 to 10, and R, R', R", and R'" each independently may be selected from the group of hydrogen and a $C_1$-$C_5$ alkyl group.

In particular, $Q_1$, $Q_2$, $Q_3$, and $Q_4$ each independently may be a $C_6$-$C_{20}$ aromatic hydrocarbon. $Q_1$, $Q_2$, $Q_3$, and $Q_4$ may all be the same. R, R', R", and R'" may all be the same.

For example, the polyester polyol modified hyperbranched (meth)acrylate may have a structure represented by Formula 2:

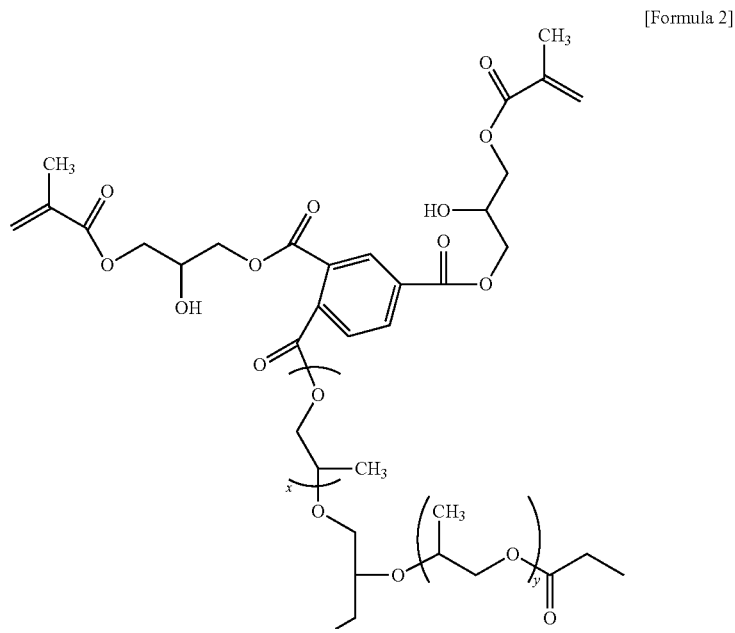

[Formula 2]

-continued
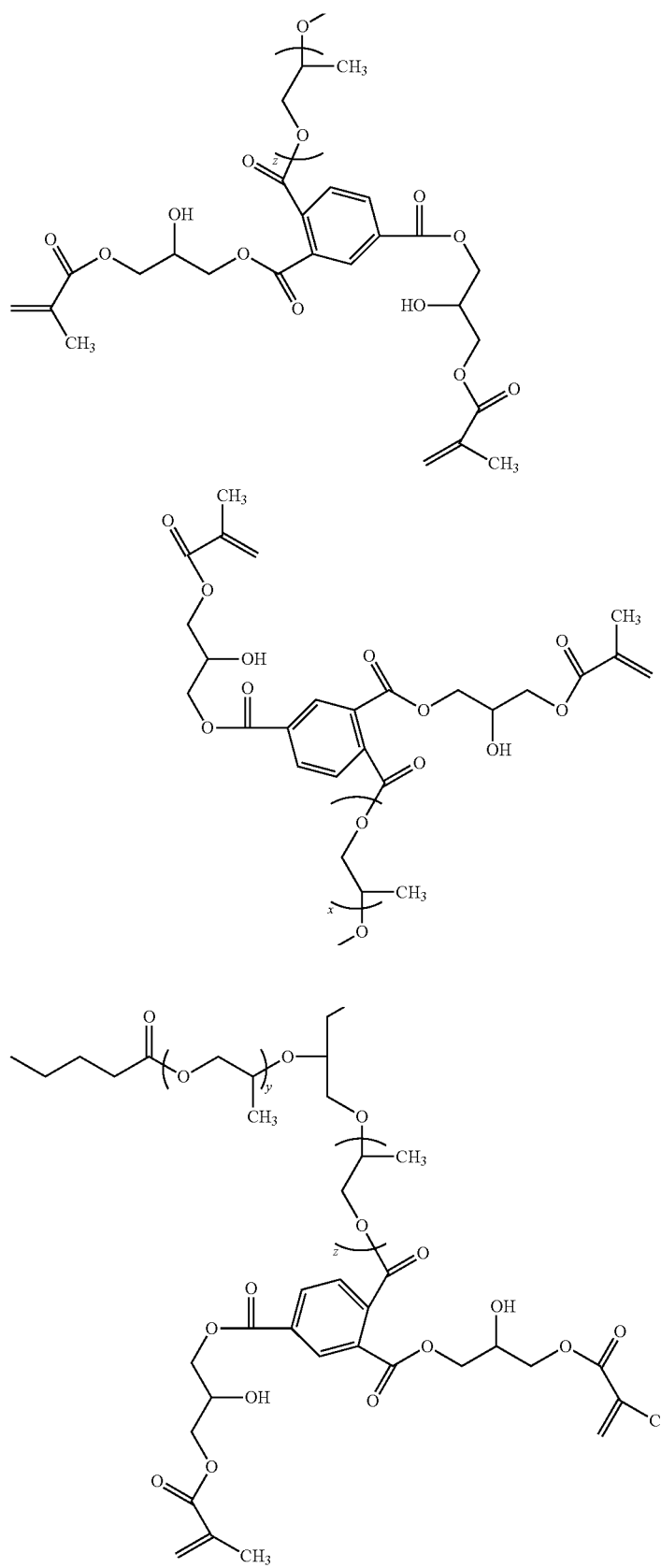

In Formula 2, x, y, and z each independently may be an integer from 0 to 5, with the proviso that the case when x, y and z are all 0 may be excluded (i.e., the sum of x+y+z may be greater than zero).

In particular, the sum of x+y+z may be 3.

The polyester polyol modified hyperbranched (meth)acrylate may be prepared through, e.g., a reaction of a $C_2$-$C_{50}$ polyester polyol having 2-20 hydroxyl groups, a $C_2$-$C_{50}$ aliphatic or $C_6$-$C_{50}$ aromatic hydrocarbon having a carboxylic acid group or derivatives thereof, and a mono-functional or polyfunctional (meth)acrylate monomer.

In an embodiment, the modified polyester polyol may be prepared by, e.g., ester condensation of a $C_2$-$C_{50}$ polyester polyol having 2-20 hydroxyl groups with a $C_2$-$C_{50}$ aliphatic or $C_6$-$C_{50}$ aromatic hydrocarbon having a carboxylic acid group or derivatives thereof. Subsequently, the modified polyester polyol may be reacted with a mono-functional or polyfunctional (meth)acrylate monomer to form a polyester polyol modified hyperbranched (meth)acrylate. The mono-functional or polyfunctional (meth)acrylate monomer may be, e.g., a glycidyl(meth)acrylate.

The polyester polyol modified hyperbranched (meth)acrylate may have a weight average molecular weight from about 2000 g/mol to about 3000 g/mol, more particularly from about 2200 g/mol to about 2500 g/mol.

The cured product of the polyester polyol modified hyperbranched (meth)acrylate may be present in an amount of about 10 wt % to about 30 wt % in the hard coating film. Within this range, film curling may be reduced without substantially reducing the pencil hardness (i.e., the pencil hardness may remain relatively unchanged). In particular, the amount of the cured product of the polyester polyol modified hyperbranched (meth)acrylate may range from about 10 wt % to about 25 wt %, more particularly from about 15 wt % to about 20 wt % in the hard coating film.

The hard coating film may be prepared by curing a composition for hard coating films including the polyester polyol modified hyperbranched (meth)acrylate. The polyester polyol modified hyperbranched (meth)acrylate may be present in an amount of about 10 wt % to about 30 wt %, based on (A)+(B)+(C)+(D) in the composition (as described below). Within this range, film curling may be reduced without substantially reducing the pencil hardness (i.e., the pencil hardness may remain relatively unchanged). In particular, the amount of the polyester polyol modified hyperbranched (meth)acrylate may be from about 10 wt % to about 25 wt %, more particularly from about 15 wt % to about 20 wt % in the composition.

The hard coating film may be prepared by curing a composition including (B) a hyperbranched (meth)acrylate oligomer, (C) reactive nanoparticles, (D) a polyfunctional monomer, and (E) a photopolymerization initiator (in addition to (A) the polyester polyol modified hyperbranched (meth)acrylate discussed above).

(B) Hyperbranched (meth)acrylate oligomer

The hyperbranched (meth)acrylate oligomer may contain greater than about 12 and not more than about 200 (meth)acrylate functional groups. In particular, the number of (meth)acrylate functional groups may be about 21 to about 150, more particularly about 50 to about 120.

The hyperbranched (meth)acrylate oligomer may be represented by Formula 3:

X-(A)n    [Formula 3]

Where X may be represented by Formula 3-1 below, A may be a (meth)acrylate, and n may be about 12 to about 200, more particularly n may be about 50 to about 200.

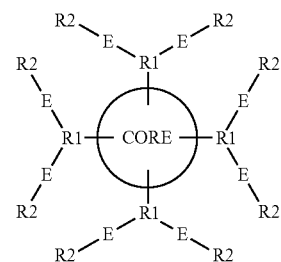

[Formula 3-1]

In Formula 3-1, the core may be selected from the group of a $C_3$-$C_{50}$ aliphatic hydrocarbon and a $C_6$-$C_{50}$ aromatic hydrocarbon having functional groups that may be bonded to R1. In an embodiment, the $C_3$-$C_{50}$ aliphatic hydrocarbon or $C_6$-$C_{50}$ aromatic hydrocarbon may contain at least one heteroatom. R1 and R2 each independently may be selected from the group of a $C_1$-$C_{50}$ aliphatic hydrocarbon and a $C_6$-$C_{50}$ aromatic hydrocarbon. In an embodiment, the $C_1$-$C_{50}$ aliphatic hydrocarbon or $C_6$-$C_{50}$ aromatic hydrocarbon may contain at least one heteroatom. E may be a divalent ester moiety.

In Formula 3, each A of (A)n may be bonded to a respective R2 in Formula 3-1.

The hyperbranched (meth)acrylate oligomer may be represented by Formula 3A:

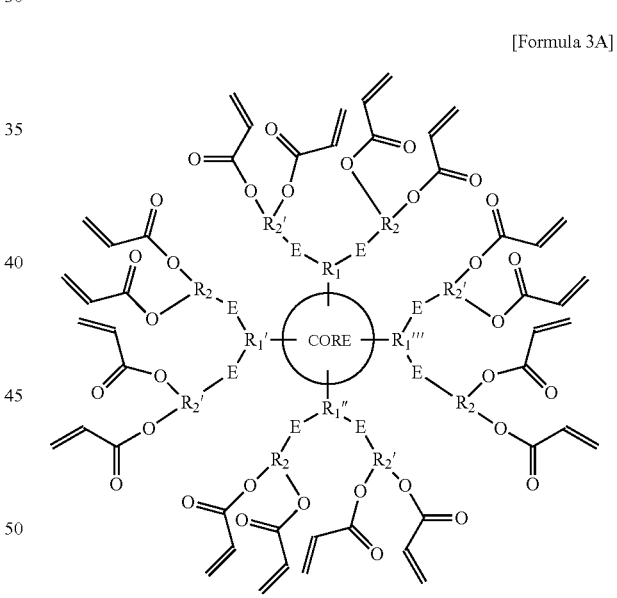

[Formula 3A]

In Formula 3A, the core may be selected from the group of a $C_3$-$C_{50}$ aliphatic hydrocarbon and a $C_6$-$C_{50}$ aromatic hydrocarbon (which may or may not contain heteroatoms) and may have functional groups capable of bonding with $R_1$, $R_1'$, $R_1''$, and $R_1'''$. $R_1$, $R_1'$, $R_1''$, $R_1'''$, $R_2$, and $R_2'$ each independently may be selected from the group of a $C_1$-$C_{50}$ aliphatic hydrocarbon and a $C_6$-$C_{50}$ aromatic hydrocarbon (which may or may not contain heteroatoms). E may be a divalent ester moiety.

The hyperbranched (meth)acrylate oligomer may be synthesized by a suitable method, e.g., by a Diels-Alder reaction or an ester condensation reaction.

In an embodiment, a monomer having tri- to hexa-functional hydroxyl groups may be subjected to ester condensation with a monomer having a carboxylic acid group and two hydroxyl groups to prepare a polyfunctional polyester polyol. Subsequently, (meth)acrylic acid may be introduced to the prepared polyfunctional polyester polyol to form a hyperbranched (meth)acrylate oligomer.

Examples of the monomer having tri- to hexa-functional hydroxyl groups may include trihydroxy propanol, pentaerythritol, dipentaerythritol, and the like. Examples of the monomer having a carboxylic acid group and two hydroxyl groups may include dihydroxy propanoic acid, dihydroxy butanoic acid, and the like. Further, the (meth)acrylic acid may be acrylic acid or methacrylic acid.

The hyperbranched (meth)acrylate oligomer may be commercially available. Examples of the oligomer include UNIDIC V 6830 manufactured by DIC CORPORATION.

The hyperbranched (meth)acrylate oligomer may have a weight average molecular weight of about 5000 g/mol to about 10,000 g/mol.

The hyperbranched (meth)acrylate oligomer may have a viscosity ranging from about 100 cps to about 400 cps at 25° C.

The hyperbranched (meth)acrylate oligomer may be present in an amount of about 15 wt % to about 60 wt % of (A)+(B)+(C)+(D). Within this range, film curling may be reduced without substantially reducing the pencil hardness (i.e., the pencil hardness may remain relatively unchanged). In particular, the amount of the hyperbranched (meth)acrylate oligomer may range from about 20 wt % to about 50 wt %, more particularly about 20 wt % to about 25 wt %.

(C) Reactive Nanoparticles

The reactive nanoparticles may be included, and thus may substantially increase surface hardness of the hard coating film. In an embodiment, the reactive nanoparticles may be surface-treated with a (meth)acrylate compound.

The reactive nanoparticles may have substantially uniform magnetic dispersion properties, and thus a dispersant and/or a coupling agent may not be needed (though they may still be included). Further, the reactive nanoparticles may not scatter permeated light, may have stable dispersion properties, and may have substantially no clogging phenomenon therebetween, and thus relatively high transparency and low turbidity may be provided.

The reactive nanoparticles may have about 3 to about 50% of their surface area surface treated with a (meth)acrylate compound. Within this range, the hard coating film may exhibit substantially uniform dispersibility and improved transparency.

The reactive nanoparticles may be suitable reactive nanoparticles, e.g., the reactive nanoparticles may include organic particles, inorganic particles, or combinations thereof. For example, at least one selected from the group of $SiO_2$, $Al_2O_3$, $CaCO_3$, $TiO_2$, and the like may be used.

The reactive nanoparticles surface-treated with a (meth)acrylate compound may be prepared, e.g., by reacting a silane coupling agent including a reactive acrylate group (for example, KBM503, ShinEtsu) with silica sol. The reactive nanoparticles surface-treated with a (meth)acrylate compound may be commercially available. For example, Nanopol C784 from Nano resins may be used.

The reactive nanoparticles may have an average particle diameter from about 10 nm to about 100 nm. Within this range, surface strength and scratch resistance of the hard coating film may be substantially prevented from being reduced and turbidity of the hard coating film may be substantially prevented from increasing.

The reactive nanoparticles may be present in an amount of about 5 wt % to about 60 wt % in (A)+(B)+(C)+(D). Within this range, the surface hardness and scratch resistance properties of the hard coating film may be improved, the curling phenomenon may be substantially minimized, and haze (turbidity) of the coating may be substantially prevented from increasing. In particular, the reactive nanoparticles may be present in an amount of about 10 wt % to about 50 wt %, more particularly about 20 wt % to about 45 wt %.

(D) Polyfunctional Monomer

The polyfunctional monomer may be a suitable polyfunctional monomer, e.g., polyfunctional (meth)acrylates derived from hydroxyl groups of polyhydric alcohols (e.g., derived from polyols), fluorine modified polyfunctional (meth)acrylate compounds, or mixtures thereof.

In an embodiment, examples of the polyfunctional (meth)acrylates derived from hydroxyl groups of polyhydric alcohols (e.g., derived from polyols) may include pentaerythritol tetra(meth)acrylate, ditrimethylolpropane tetra(meth)acrylate, dipentaerythritol hexa(meth)acrylate, pentaerythritol tri(meth)acrylate, tri(2-hydroxyethyl) isocyanurate tri(meth)acrylate, trimethylolpropane tri(meth)acrylate, hexanediol di(meth)acrylate, dicyclodecane dimethanol di(meth)acrylate, and the like. These may be used alone or in combination of two or more thereof. The polyhydric alcohols may refer to alcohols having about 2 or more, particularly about 2 to 6 hydroxyl groups.

The fluorine modified polyfunctional (meth)acrylate compound may be formed by reacting a compound containing a perfluoro polyether with a polyfunctional (meth)acrylate. More particularly, the fluorine modified polyfunctional (meth)acrylate compound may be a monomer having about 2 to about 16 functional groups formed by reacting a perfluoro polyether compound having various functional groups (such as, e.g., perfluoro polyether polyol compounds having hydroxyl groups, perfluoro polyether dibasic acid compounds having carboxylic acids, and perfluoro polyether epoxy compounds having epoxy groups) with a polyfunctional (meth)acrylate compound (such as, e.g., a modified (meth)acrylate compound having carboxylic acid groups, a (meth)acrylate compound having epoxy groups, and a (meth)acrylate compound having isocyanate groups). These may be used alone or in combination of two or more thereof.

The polyfunctional monomer may be present in an amount of about 1 wt % to about 40 wt % in (A)+(B)+(C)+(D). Within this range, surface strength and scratch resistance of the hard coating film may be substantially prevented from being reduced, the curling phenomenon may be substantially minimized, and haze (turbidity) of the coating of the particles may be substantially prevented from increasing. In particular, the polyfunctional monomer may be added in an amount of about 10 wt % to about 30 wt %, more particularly about 15 wt % to about 25 wt %.

(E) Photopolymerization Initiator

A suitable photopolymerization initiator may be included in the composition. For example, benzophenone compounds (such as, e.g., 1-hydroxy cyclohexylphenyl ketone) may be used.

The photopolymerization initiator may be present in an amount of about 1-10 phr (parts per hundred) by weight based on (A)+(B)+(C)+(D) (i.e., a total amount of (A) the polyester polyol modified hyperbranched (meth)acrylate, (B) the hyperbranched (meth)acrylate oligomer, (C) the reactive nanoparticles, and (D) the polyfunctional monomer).

The composition may further include (F) a reactive fluorine compound.

(F) Reactive Fluorine Compound

The reactive fluorine compound may have reactive groups of mono- or more functional groups, particularly bi- or more functional groups. The reactive fluorine compound may be included as a surfactant, and thus may improve scratch resistance of the film.

Examples of the reactive fluorine compounds may include monomers, oligomers, and prepolymers that include polyfunctional acrylate or methacrylate containing fluorinated alkyl groups. Examples of the polyfunctional acrylate or methacrylate may include, e.g., a (meth)acrylate having epoxy groups, a (meth)acrylate having carboxylic groups, a (meth)acrylate having hydroxyl groups, a (meth)acrylate having amino groups, a (meth)acrylate having sulfonic acid groups, and the like.

Such reactive fluorine compounds may include a compound represented by Formula 4:

Ar—Rf—Ar.   [Formula 4]

In Formula 4, Ar may be $CH_2=CR_3COO$, $R_3$ may be selected from the group of a hydrogen atom and a $C_1$-$C_3$ alkyl group, Rf may be a perfluoroalkylene group having a structure represented by one selected from the group of Formulae 5-A, 5-B, 5-C, 5-D, and 5-E:

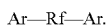

Formula 5-A

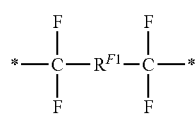

Formula 5-B

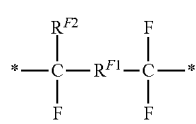

Formula 5-C

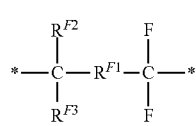

Formula 5-D

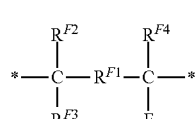

Formula 5-E

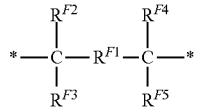

In Formula 5-A, 5-B, 5-C, 5-D, and 5-E, * is a bonding site for Ar, $R^{F1}$ may be a straight or branched $C_1$-$C_{10}$ perfluoroalkylene group, and $R^{F2}$, $R^{F3}$, $R^{F4}$, and $R^{F5}$ each independently may be a straight or branched $C_1$-$C_{14}$ perfluoroalkyl group.

The reactive fluorine compounds may be present in an amount of about 0.01 parts by weight to about 5 parts by weight, based on 100 parts by weight of the composition. Within this range, the film may have improved scratch resistance. In particular, the amount of the reactive fluorine compounds may range from about 0.1 parts by weight to about 3 parts by weight.

The composition may further include a suitable UV curable resin. In an embodiment, the UV curable resins may have (meth)acrylate functional groups. Examples of the ultraviolet curable resins may include (meth)acrylate resins of polyfunctional compounds such as polyester resins, polyether resins, acryl resins, epoxy resins, urethane resins, alkyd resins, spiroacetal resins, polybutadiene resins, polythiolpolyene resins, polyhydric alcohols, and the like, the molecular weight (e.g., weight average molecular weight) of which may be relatively small, for example from about 100 to about 1,000 Mw.

The composition may additionally include suitable additives, such as, e.g., solvents, light sensitizers, phlegmatizers, polymerization inhibitors, leveling agents, wettability improvers, plasticizers, ultraviolet absorbers, antioxidants, antistatic agents, silane coupling agents, inorganic fillers, antifoaming agents, and the like. These additives may be used alone or in combination of two or more thereof.

The composition may further include solvents. Illustrative examples of applicable solvents may include, e.g., ketones such as methylethyl ketone, cyclohexanone, acetone, diacetone alcohol; polyhydric alcohols and ethers such as methyl cellosolve, ethyl cellosolve, butyl cellosolve, cellosolve acetate; esters such as methyl acetate, ethyl acetate; halogenated hydrocarbons such as chloroform, methylene chloride, tetrachloroethane; nitrogen-containing compounds such as nitromethane, acetonitrile, N-methylpyrrolidone, N,N-dimethylformamide; dimethylsulfoxide; and the like. These solvents may be used alone or in combination of one or two or more thereof.

The hard coating film may be prepared by a suitable method. In an embodiment, a composition for hard coating films may be applied to a base film, dried, and cured by UV light to obtain the hard coating film. The conditions for drying and ultraviolet curing may be suitable conditions. For example, the film may be dried at about 30-100° C. for about 1-5 minutes. For curing, UV light may be irradiated at an intensity of about 100-800 mJ/cm².

In an embodiment, a composition for hard coating films may include (A) a polyester polyol modified hyperbranched (meth)acrylate; (B) a hyperbranched (meth)acrylate oligomer; (C) reactive nanoparticles; (D) a polyfunctional monomer; and (E) a photopolymerization initiator.

In an embodiment, the composition may further include (F) a reactive fluorine compound.

In an embodiment, a polarizing plate may include a polarizer; a base film formed on at least one surface of the polarizer; and a hard coating film formed on the base film.

The polarizer may be used in the preparation of a polarizing plate, and may be prepared, e.g., by stretching a polyvinyl alcohol film and dyeing the film.

The base film described above may act as a protective film. The base film may have a thickness of not more than about 40 µm, particularly about 25 µm to about 40 µm.

The hard coating film described above may have a thickness in the range from about 2 µm to about 30 µm.

In an embodiment, a liquid crystal display may include the polarizing plate.

In an embodiment, the polarizing plate for the liquid crystal display may be used as a front surface polarizing plate located at a front surface of the liquid crystal display panel, a rear surface polarizing plate located at the rear surface thereof, i.e., between a backlight unit and the liquid crystal display panel, or as both front and rear surface polarizing plates.

FIG. 1 illustrates, by way of example, a liquid crystal display including a liquid crystal display panel 100 having a polarizing plate thereon that includes a polarizer 200, a base film 300, and a hard coat film 400. The polarizer 200 may include the base film 300 and/or hard coat film 400 on one or both surfaces thereof, and the polarizing plate may be on one or both surfaces of the liquid crystal display panel 100.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

PREPARITIVE EXAMPLE

Polyester Polyol Modified Hyperbranched (meth)acrylate

In a four-neck glass flask, 15.89 g of polyesterpolyol (GL-AA, manufactured by Miwon Commercial Co., Ltd.) (0.026 mol), 19.98 g of trimellitic anhydride (0.104 mol), 30 g of N-methyl formamide as a solvent, 0.05 g of hydroquinone monomethyl ether as a polymerization inhibitor, and 0.5 g of benzyltriethyl ammonium chloride as a polymerization catalyst were placed and polymerized by heating to 90 ° C. It was confirmed using FT-IR spectroscopy that the absorbing bands of the anhydride disappeared. After cooling the resultant to 80° C., 29.57 g of glycidyl methacrylate (0.208 mol) was added thereto, heated to and maintained at 90° C. for 20 hours. After removing all of the solvent N-methyl formamide at 5 torr or less at 85° C., the reaction was completed to yield a polyester polyol modified hyperbranched (meth)acrylate.

EXAMPLES AND COMPARATIVE EXAMPLES

Each component used in the following Examples and Comparative Examples were as follows:
(A) Polyester polyol modified hyperbranched (meth)acrylate: The hyperbranched (meth)acrylate prepared in the above preparative example was used.
(B) Hyperbranched (meth)acrylate oligomer: UNIDIC V 6830 (DIC CORPORATION) was used.
(B') Urethane acrylate resin: RC27-947 (which does not include a hyperbranched structure) (DIC CORPORATION) was used.
(C) Reactive nanoparticle: Nanopol C784 (Nanoresin) was used.
(D) Polyfunctional monomer: DPHA (dipentaerythritol hexaacrylate) (SK Cytec) was used.
(E) Photopolymerization initiator: Irgacure-184 (Ciba Specialty Chemicals) was used.

Examples 1 and 2

Each component as listed above was introduced at amounts (unit: parts by weight) shown in Table 1 and stirred at 25° C. for 20 minutes to yield a dispersion. To the mixture, 3 phr of the photopolymerization initiator listed above in terms of solid content was added and stirred at 25° C. for 10 minutes to prepare a hard coating composition.

The prepared hard coating composition was coated to a thickness of 8-13 µm on a 40 µm thick TAC film (Fuji Company) using a #16 Meyer bar coater and dried at 80° C. for 2 minutes. Then, the coating was cured by irradiating UV light at an intensity of 350 mJ/cm$^2$ through a high pressure mercury lamp.

The TAC film having the hard coating layer formed thereon was evaluated as to pencil hardness, curling, scratch resistance, and rainbow phenomenon in accordance with JIS standards. The results are shown in Table 1 below.

Comparative Examples 1 and 2

A hard coating film was prepared in the same manner as in Examples 1 and 2, except that each component was introduced at amounts as shown in Table 1.

Evaluation of Physical Properties (1) Pencil hardness: The pencil hardness was determined using a Pencil Hardness Tester (manufactured by Shinto Scientific, Heidon) using a Mitsubishi Pencil (UNI) after drawing a line at a rate of 0.5 mm/sec under a load of 500 kg/cm$^2$.

(2) Curling: By using a film sample with a size of 100 mm×100 mm at 25° C., the highest height among the four corners of the film was measured, as shown in FIG. 2. Curling refers to a maximum curled height from the bottom of the film when the film was stacked to a thickness of about 2 µm to 30 µm on a base film having a thickness of about 40 µm.
0 to 20 mm: Good
greater than 20 mm and 40 mm or less: Poor
greater than 40 mm: Very poor.

(3) Scratch resistance: #0000 steel wool was reciprocated along a distance of 100 mm on the film at a rate of 50 mm/sec 10 times under a load of 1,000 kg/cm$^2$ and scratching was observed using a scratch resistance tester (Shinto Scientific, Heidon). When scratch resistance was not found, it was marked by o, and when scratch resistance was found, it was marked by X.

(4) Rainbow (interference fringes) Test: In order to prevent back side reflection, a black tape was attached onto the other surface of the hard coating layer and the hard coating layer was observed with the naked eye under a three wave fluorescent lamp. The results were evaluated by the following standard.
<Evaluation Standard for Rainbow>
1: No rainbow in all directions.
2: Weak rainbow
3: Strong rainbow.

TABLE 1

|  | Example | | Comparative Example | |
|---|---|---|---|---|
|  | 1 | 2 | 1 | 2 |
| (A) | 15 | 20 | — | — |
| (B) | 25 | 20 | 40 | — |
| (B') | — | — | — | 40 |
| (C) | 40 | 40 | 40 | 40 |
| (D) | 20 | 20 | 20 | 20 |
| Thickness of base film (μm) | 40 | 40 | 40 | 40 |
| Pencil hardness | 4H | 3H | 4H | 4H |
| Film curling (mm) | Good, 15 | Good, 11 | Poor, 32 | Very Poor, 47 |
| Scratch Resistance | ○ | ○ | ○ | ○ |
| Rainbow | 1 | 1 | 1 | 1 |

As shown in Table 1, the hard coating agent prepared in Example 1 exhibited relatively increased pencil hardness as well as a relatively improved curling phenomenon when applied to a base film having a thickness of 40 μm. On the contrary, Comparative Example 1, which does not include the polyester polyol modified hyperbranched (meth)acrylate, exhibited relatively increased pencil hardness, but relatively poor curling phenomenon. In addition, Comparative Example 2 which includes urethane acrylate exhibited relatively increased pencil hardness, but a relatively poor curling phenomenon.

By way of summary and review, a polarizing plate may include a base film (e.g., made of a cellulose resin or the like) attached to both surfaces of a polarizer (e.g., a film of polyvinyl alcohol (PVA) and the like). A hard coating film may be on one surface of the base film, and thus may protect the polarizing plate. A liquid crystal display (LCD) panel may be on the other surface of the base film. Such a polarizing plate may be used as part of an LCD.

The surface of the polarizing plate may include a high hardness hard coating film, and thus substantially improved durability may be provided under various use conditions. A hard coating film may have a thickness of about 10 μm or more, and thus high hardness (e.g., a pencil hardness of 3H or more) may be provided. However, as the thickness increases, the curling phenomenon may increase, and thus film deformation or rupture (e.g., in the course of production of polarizing plates) may result.

The thickness of the base film (to which the hard coating film is applied) may become thinner, and thus the thickness of the polarizing plate may be decreased and a compact and lightweight LCD may be achieved. When applying a hard coating film to a base film which is relatively thin, high hardness of the hard coating film may be secured, however, the curling phenomenon may increase, and thus a possibility of film rupture may increase (e.g., in production of the polarizing plates).

The foregoing conditions may be substantially avoided by using a hard coating film/composition according to the disclosed embodiments. Such a hard coating film/composition may include a polyester polyol modified hyperbranched (meth)acrylate and/or a cured product thereof, and may provide reduced curling when applied to a base film (even a relatively thin base film), improved scratch resistance, and may substantially prevent a rainbow phenomenon while maintaining a pencil hardness of about 3H or more.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A hard coating film, comprising:
a cured product of a polyester polyol modified hyperbranched (meth)acrylate represented by Formula 1:

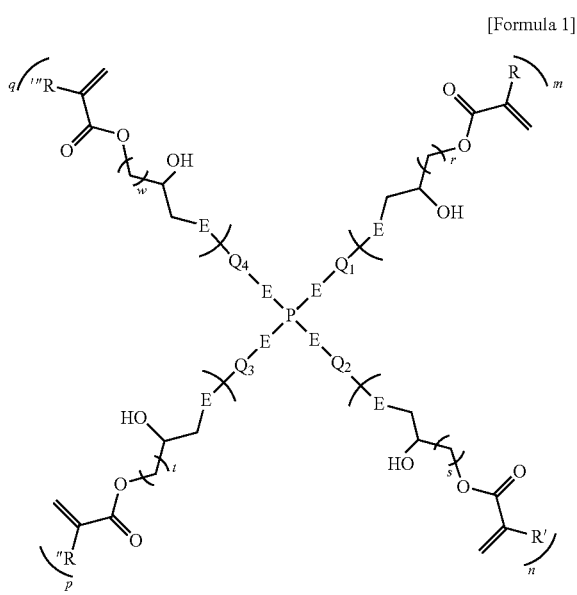

[Formula 1]

wherein, in Formula 1:
P is a $C_2$-$C_{50}$ polyester,
E is a divalent ester moiety,
$Q_1$, $Q_2$, $Q_3$, and $Q_4$ are each independently selected from the group of a $C_2$-$C_{50}$ aliphatic hydrocarbon and a $C_6$-$C_{50}$ aromatic hydrocarbon,
m, n, p, q, r, s, t, and w are each independently an integer from 1 to 10, and
R, R', R", and R'" are each independently selected from the group of hydrogen and a $C_1$-$C_5$ alkyl group,
wherein film curling of the hard coating film is from 0 to about 20 mm when the hard coating film has a thickness of about 2 μm to about 30 μm, and is stacked on a base film having a thickness of about 40 μm or less, and
wherein about 10 wt % to about 30 wt % of the hard coating film is from the polyester polyol modified hyperbranched (meth)acrylate.

2. The hard coating film as claimed in claim 1, wherein the polyester polyol modified hyperbranched (meth)acrylate has a weight average molecular weight of about 2000 g/mol to about 3000 g/mol.

3. The hard coating film as claimed in claim 1, wherein the polyester polyol modified hyperbranched (meth)acrylate is represented by Formula 2:

[Formula 2]
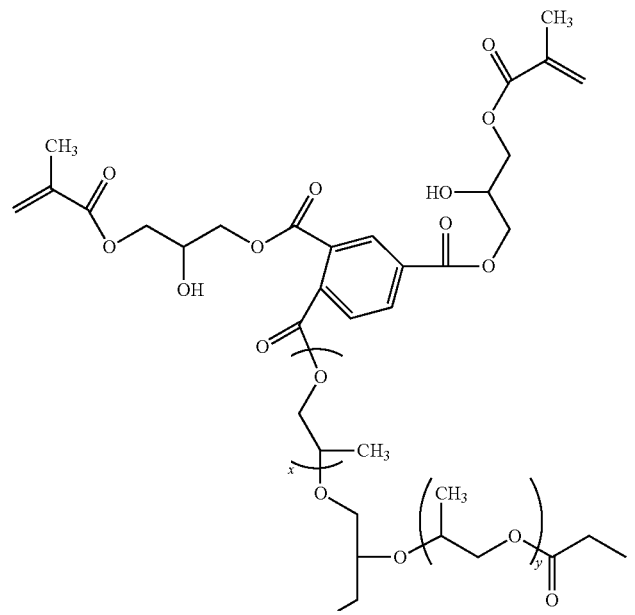
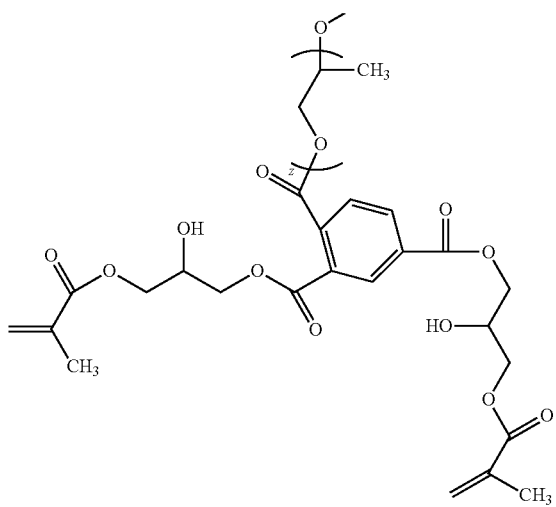
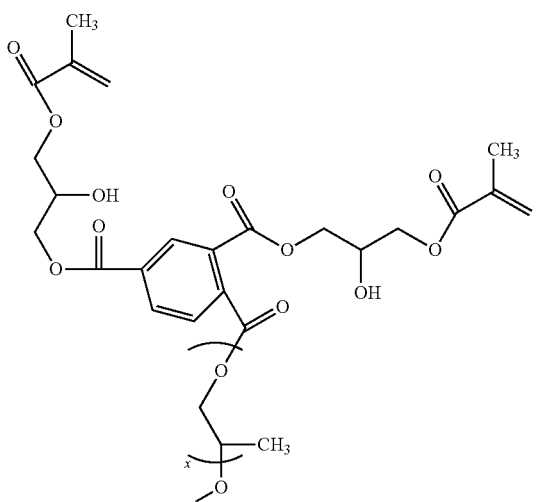

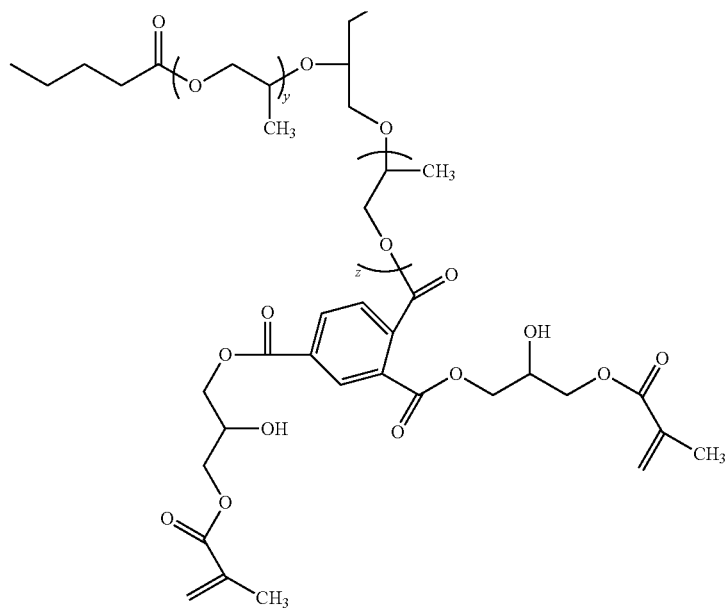

wherein, in Formula 2, x, y, and z are each independently an integer from 0 to 5, with the proviso that x +y +z >0.

4. The hard coating film as claimed in claim 1, wherein the hard coating film is formed of a composition, the composition including:
   the polyester polyol modified hyperbranched (meth)acrylate;
   a hyperbranched (meth)acrylate oligomer represented by Formula 3;
   reactive nanoparticles;
   a polyfunctional monomer; and
   a photopolymerization initiator,

[Formula 3]

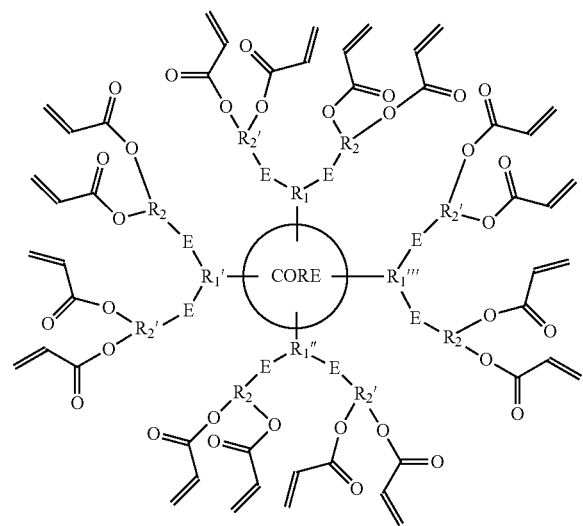

wherein, in Formula 3:
the core is selected from the group of a $C_3$-$C_{50}$ aliphatic hydrocarbon and a $C_6$-$C_{50}$ aromatic hydrocarbon, $R_1$, $R_1'$, $R_1''$, $R_1'''$, $R_2$, and $R_2'$ are each independently selected from the group of a $C_1$-$C_{50}$ aliphatic hydrocarbon and a $C_6$-$C_{50}$ aromatic hydrocarbon, and
E is a divalent ester moiety.

5. The hard coating film as claimed in claim 4, wherein, in Formula 3, at least one selected from the group of the core, $R_1$, $R_1'$, $R_1''$, $R_1'''$, $R_2$, and $R_2'$ includes at least one heteroatom.

6. The hard coating film as claimed in claim 4, wherein the hyperbranched (meth)acrylate oligomer has a weight average molecular weight of about 5000 g/mol to about 10,000 g/mol.

7. The hard coating film as claimed in claim 4, wherein the reactive nanoparticles have an average particle diameter of about 10 nm to about 100 nm.

8. The hard coating film as claimed in claim 4, wherein the reactive nanoparticles include inorganic nanoparticles, and about 3% to about 50% of a surface area of the inorganic nanoparticles is surface-treated with a (meth)acrylate compound.

9. The hard coating film as claimed in claim 8, wherein the inorganic nanoparticles include at least one selected from the group of $SiO_2$, $Al_2O_3$, $CaCO_3$, and $TiO_2$.

10. The hard coating film as claimed in claim 4, wherein the polyfunctional monomer includes at least one selected from the group of a hydroxyl group-containing polyfunctional (meth)acrylate compound and a fluorine modified polyfunctional (meth)acrylate compound.

11. The hard coating film as claimed in claim 4, wherein the composition includes:
   about 10 wt % to about 30 wt % of the polyester polyol modified hyperbranched (meth)acrylate,
   about 15 wt % to about 60 wt % of the hyperbranched (meth)acrylate oligomer,
   about 5 wt % to about 60 wt % of the reactive nanoparticles,
   about 1 wt % to about 40 wt % of the polyfunctional monomer, and
   about 1 phr by weight to about 10 phr by weight of the photopolymerization initiator, based on a total weight of the polyester polyol modified hyperbranched (meth)acrylate, the hyperbranched (meth)acrylate oligomer, the reactive nanoparticles, and the polyfunctional monomer.

12. The hard coating film as claimed in claim 4, wherein the composition further includes a reactive fluorine compound.

13. The hard coating film as claimed in claim 12, wherein the reactive fluorine compound is represented by Formula 4:

Ar—Rf—Ar,     [Formula 4]

wherein, in Formula 4:

Ar is $CH_2=CR_3COO$, $R_3$ is selected from the group of a hydrogen atom and a $C_1$-$C_3$ alkyl group, Rf is a perfluoroalkylene group having a structure represented by one selected from the group of Formulae 5-A, 5-B, 5-C, 5-D, and 5-E:

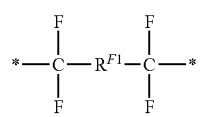

Formula 5-A

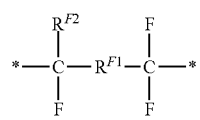

Formula 5-B

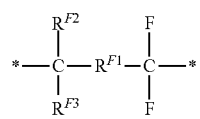

Formula 5-C

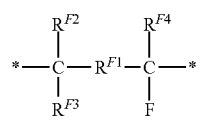

Formula 5-D

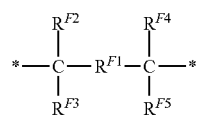

Formula 5-E

* is a bonding site for Ar, $R^{F1}$ is a straight or branched $C_1$-$C_{10}$ perfluoroalkylene group, and $R^{F2}$, $R^{F3}$, $R^{F4}$, and $R^{F5}$ each independently are H, a straight or branched $C_1$-$C_{14}$ perfluoroalkyl group.

14. The hard coating film as claimed in claim 12, wherein the reactive fluorine compound is present in an amount of about 0.01 parts by weight to about 5 parts by weight, based on 100 parts by weight of the composition.

15. A composition for hard coating films, comprising:

a polyester polyol modified hyperbranched (meth)acrylate represented by Formula 1;

a hyperbranched (meth)acrylate oligomer represented by Formula 3;

reactive nanoparticles;

a polyfunctional monomer; and a photopolymerization initiator:

[Formula 1]

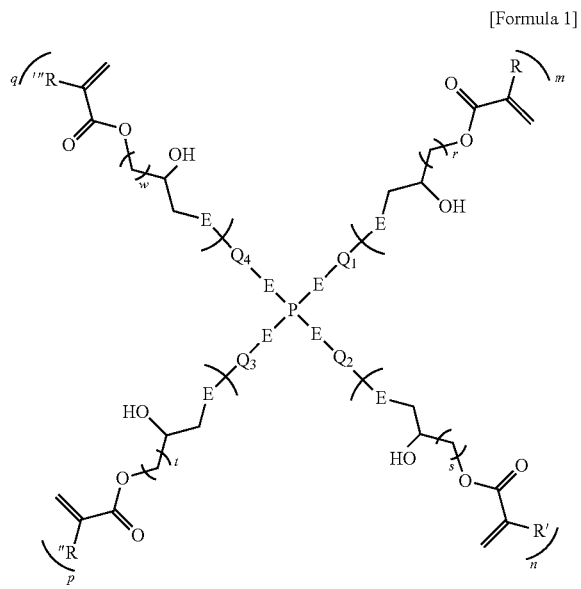

wherein, in Formula 1,

P is a $C_2$-$C_{50}$ polyester,

E is a divalent ester moiety, $Q_1$, $Q_{2l}$, $Q_3$, and $Q_4$ are each independently selected from the group of a $C_2$-$C_{50}$ aliphatic hydrocarbon and a $C_6$-$C_{50}$ aromatic hydrocarbon, m, n, p, q, r, s, t, and w are each independently an integer from 1 to 10, and R, R', R", and R'" are each independently selected from the group of hydrogen and a $C_1$-$C_5$ alkyl group,

[Formula 3]

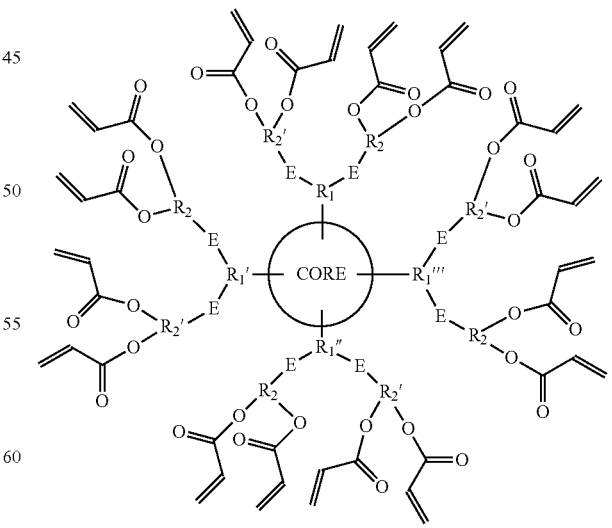

wherein, in Formula 3:

the core is selected from the group of a $C_3$-$C_{50}$ aliphatic hydrocarbon and a $C_6$-$C_{50}$ aromatic hydrocarbon, $R_1$, $R_1'$, $R_1''$, $R_1'''$, $R_2$, and $R_2'$ are each independently selected from the group of a $C_1$-$C_{50}$ aliphatic hydrocarbon and a $C_6$-$C_{50}$ aromatic hydrocarbon, and E is a divalent ester moiety.

16. The composition as claimed in claim 15, wherein the composition includes:

about 10 wt % to about 30 wt % of the polyester polyol modified hyperbranched (meth)acrylate, about 15 wt % to about 60 wt % of the hyperbranched (meth)acrylate oligomer, about 5 wt % to about 60 wt % of the reactive nanoparticles, about 1 wt % to about 40 wt % of the polyfunctional monomer, and about 1 phr by weight to about 10 phr by weight of the photopolymerization initiator, based on a total weight of the polyester polyol modified hyperbranched (meth)acrylate, the hyperbranched (meth)acrylate oligomer, the reactive nanoparticles, and the polyfunctional monomer.

17. The composition as claimed in claim 15, further comprising a reactive fluorine compound.

18. A polarizing plate, comprising:

a polarizer;

a base film on at least one surface of the polarizer; and the hard coating film as claimed in claim 1.

19. A liquid crystal display, comprising the polarizing plate as claimed in claim 18.

\* \* \* \* \*